(12) United States Patent
Esparza et al.

(10) Patent No.: US 11,350,794 B2
(45) Date of Patent: Jun. 7, 2022

(54) TRAY APPARATUS

(71) Applicant: Creator, Inc., San Francisco, CA (US)

(72) Inventors: Noe Esparza, San Francisco, CA (US); James Brinkman, South San Francisco, CA (US); Jaylyn Daugherty, San Francisco, CA (US); Abigail Soong, San Francisco, CA (US)

(73) Assignee: Creator, Inc., San Francisco, CA (US)

( * ) Notice: Subject to any disclaimer, the term of this patent is extended or adjusted under 35 U.S.C. 154(b) by 356 days.

(21) Appl. No.: 16/447,925

(22) Filed: Jun. 20, 2019

(65) Prior Publication Data

US 2020/0397192 A1    Dec. 24, 2020

(51) Int. Cl.
*A47J 44/00* (2006.01)
*A22C 7/00* (2006.01)

(52) U.S. Cl.
CPC ............ *A47J 44/00* (2013.01); *A22C 7/0076* (2013.01)

(58) Field of Classification Search
CPC A47J 44/00; A47J 43/145; A47J 27/14; A47J 37/044; A47J 37/0857; A47J 37/0864; A22C 7/0076
USPC ......... 99/327, 332, 355, 373, 352, 335, 348, 99/386, 349, 390, 393, 423, 496, 576, 99/580, 537, 509; 426/500, 513, 518, 426/524
See application file for complete search history.

(56) References Cited

U.S. PATENT DOCUMENTS 5,756,133 A * 5/1998 Duggan ................... A23G 4/02
198/435

* cited by examiner

*Primary Examiner* — Phuong T Nguyen
(74) *Attorney, Agent, or Firm* — Miller Johnson

(57) ABSTRACT

A tray apparatus includes an elongated platform and a tray mechanism. The tray mechanism includes a plate disposed onto the platform and an arm assembly coupled to the plate and including a post and an arm. The post is coupled to the plate and extends upwardly therefrom. The arm is rotatably coupled to the post between a first position and a second position. The plate receives a box containing foodstuffs from a conveyance apparatus. The plate moves in a first direction when moving from a first state toward a second state. The arm is configured to contact the box and rotate from the first position toward the second position when the plate is moving in the first direction. The arm is configured to contact and move the box in a second direction opposite the first along the platform when the plate moves from the second state toward the first state.

20 Claims, 17 Drawing Sheets

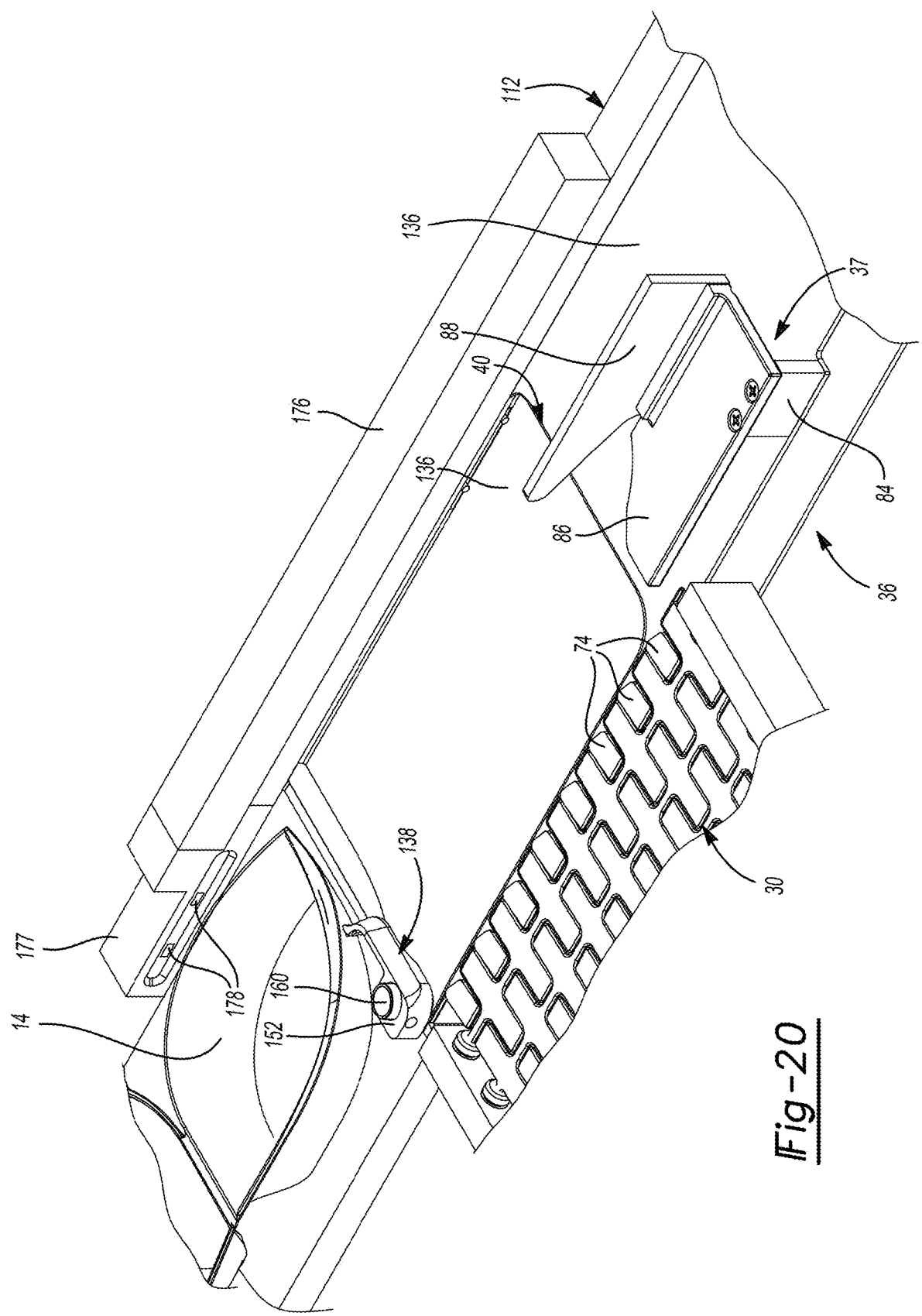

TRAY APPARATUS

FIELD

The present disclosure relates to food handling and more particularly to automated systems and methods for handling of freshly prepared food.

BACKGROUND

Preparation of foodstuffs (for example, hamburgers, sandwiches, etc.) according to a consumer's custom order can be time-consuming and labor-intensive. Furthermore, the process of preparing custom-ordered foodstuffs is susceptible to errors and wide variations in quality. The present disclosure provides an automated food preparation system that can quickly and accurately prepare foodstuffs according to a wide variety of possible custom orders with limited human involvement.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A tray apparatus includes an elongated platform and a tray mechanism. The tray mechanism includes a plate disposed onto the platform and an arm assembly coupled to the plate and including a post and an arm. The post is fixedly coupled to the plate and extends upwardly therefrom. The arm is rotatably coupled to the post between a first position and a second position. The plate is configured to receive a box containing foodstuffs from a conveyance apparatus. In other features, a container, which is a superset that includes a box, a bag, and a bowl, contains the foodstuffs. The plate is movable between first and second states. The plate moves in a first longitudinal direction of the platform when moving from the first state toward the second state. The plate moves in a second longitudinal direction of the platform that is opposite the first longitudinal direction when moving from the second state toward the first state. The arm is configured to contact the box and rotate from the first position toward the second position when the plate is moving from the first state toward the second state. The arm is configured to contact and move the box in the second longitudinal direction along the platform when the plate moves from the second state toward the first state.

In other features, the post includes a slot having a helical shape. In other features, the tray apparatus includes a bearing and a fastener at least partially disposed in the slot. The fastener extends through the bearing and attaches to the arm so that the bearing and the arm translates in the slot as the arm moves between the first and second positions. In other features, the arm assembly includes a cap attached to an end of the platform. The cap acts as a stop to prevent the bearing and the fastener from being removed from the slot.

In other features, the arm extends (i) perpendicular to the first longitudinal direction of the platform when in the first position and (ii) parallel to the first longitudinal direction of the platform when in the second position. In other features, the arm is permitted to rotate in a clockwise direction and prevented from rotating in a counter-clockwise direction. In other features, the arm is near or at a lower end of the post when in the first position and near or at an upper end of the post when in the second position.

In other features, the tray apparatus includes an alignment mechanism attached to the platform. The alignment mechanism includes a guide plate and a stopping plate. The guide plate is configured to contact and move the box laterally when the plate is moving from the first state toward the second state. The stopping plate is attached to the guide plate and configured to contact and prevent the box from moving further in the first longitudinal direction when the plate moves from the first state toward the second state. In other features, the guide plate and the platform cooperate to define a space that accommodates the arm assembly when the plate is moving between the first and second states.

In other features, the tray apparatus includes a plurality of tabs integral with and extending outwardly from a lateral side of the platform. The plurality of tabs is configured to interface with the conveyance apparatus. In other features, the tray apparatus includes guide members attached to the plurality of tabs. Each guide member inclines upwardly from a first end positioned at a distal end of a respective tab toward a second end positioned at a proximal end of the respective tab. In other features, the tray apparatus includes a ledge attached to the platform and configured to receive the box from the platform and a sensor associated with the ledge and configured to detect another box on the ledge. The plate of the tray mechanism is prevented from moving from the second state toward the first state when the sensor detects the another box on the ledge. In other features, the sensor is an optical sensor.

A tray apparatus includes an elongated platform and a tray mechanism. The tray mechanism includes a plate disposed onto the platform and configured to receive a box containing foodstuffs from a conveyance apparatus. The plate is movable in a first longitudinal direction of the platform when moving from a first state toward a second state. The plate is also movable in a second longitudinal direction of the platform that is opposite the first longitudinal direction when moving from the second state toward the first state. An alignment mechanism is attached to the platform. The alignment mechanism includes a guide plate and a stopping plate. The guide plate is configured to move the box laterally relative to the platform when the plate moves from the first state toward the second state a first distance. The stopping plate is attached to the guide plate. The stopping plate is configured to contact and prevent the box from moving further in the first longitudinal direction when the plate moves from the first state toward the second state a second distance. A ledge is attached to the platform and configured to receive the box from the platform. A sensor is associated with the ledge and configured to detect an object on the ledge. The plate of the tray mechanism is prevented from moving from the second state toward the first state when the sensor detects the object on the ledge.

In other features, the guide plate and the platform cooperate to define a space that accommodates the plate when the plate moves between the first and second states. In other features, the sensor is an optical sensor. In other features, the tray mechanism further includes a sliding mechanism movable between a first position and a second position. The plate is cantilevered to the sliding mechanism. The plate is movable from the first state toward the second state when the sliding mechanism moves from the first position toward the second position. The plate is movable from the second state toward the first state when the sliding mechanism moves from the second position toward the first position. In other features, a bottom surface of the plate has a Teflon® coating.

In other features, the tray apparatus includes a plurality of tabs integral with and extending outwardly from a lateral side of the platform. The plurality of tabs is configured to interface with the conveyance apparatus. In other features, the tray apparatus includes guide members attached to the plurality of tabs. Each guide member inclines upwardly from a first side facing away from the ledge toward a second side facing toward the ledge.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 20 is a perspective view of the tray apparatus with the tray mechanism in the first position and the box at the pick-up ledge.

In the drawings, reference numbers may be reused to identify similar and/or identical elements.

DETAILED DESCRIPTION

Figure 1:
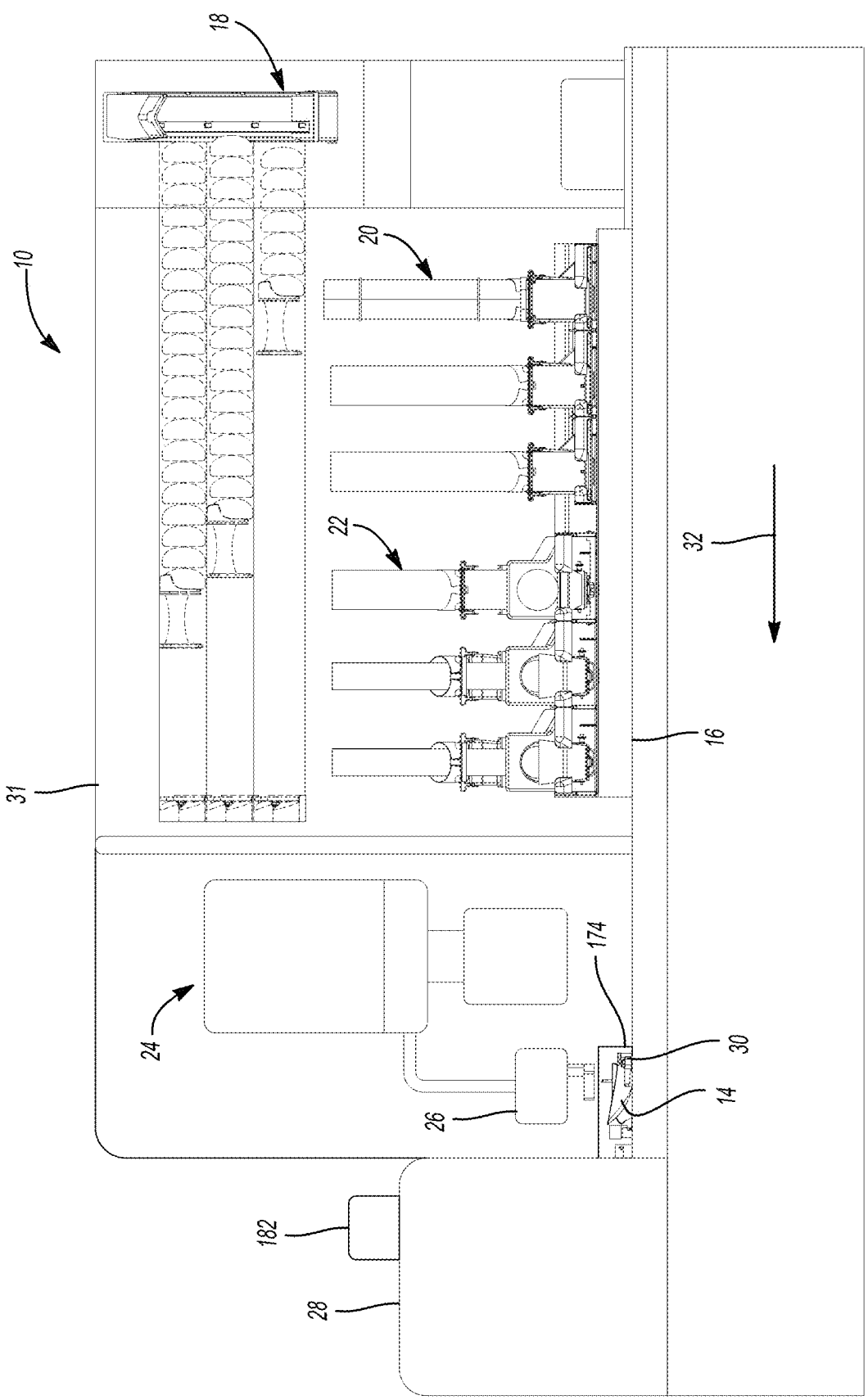
FIG. 1 is a front view of an automated food preparation system according to the principles of the present disclosure.

As shown in FIG. 1, an example of an automated food preparation system 10 is provided. The automated food preparation system 10 includes one or more stations, such as a box-dispensing apparatus (not shown) for placing a box 14 or other food container onto a modular conveyance apparatus 16. A food container according to the present disclosure may be a clamshell box, a bowl, a bag, or any other suitable container for the food being prepared.

The automated food preparation system further includes a bun-dispensing apparatus 18, a sauce-dispensing apparatus 20, a toppings-dispensing apparatus 22, a food-heating apparatus 24, a seasonings apparatus 26, a grinding and cooking apparatus 28 and a tray apparatus 30. The automated food preparation system 10 also includes a housing 31 that houses the apparatuses 16, 18, 20, 22, 24, 26, 30. The modular conveyance apparatus 16 transports the box 14 in a first direction 32 to deliver it to one or more of the stations. In one example, the box-dispensing apparatus (not shown) places a box 14 on the modular conveyance apparatus 16.

The bun-dispensing apparatus 18 slices, toasts, and butters a bun, then dispenses the bun in the box 14. The sauce-dispensing apparatus 20 dispenses sauce on the bun. The toppings-dispensing apparatus 22 prepares toppings, such as by slicing or grating, and dispenses the toppings on the bun. In various implementations, the toppings-dispensing apparatus 22 grates cheese and dispenses it on the bun. The food-heating apparatus 24 heats the cheese to melt the cheese onto the bun. The seasonings apparatus 26 dispenses seasonings onto the bun. The grinding and cooking apparatus 28 grinds a protein, such as meat, forms a patty, cooks the patty, and deposits it onto the bun. Each of the stations may include multiple subsystems. Furthermore, the automated food preparation system 10 may include different or additional systems and subsystems.

The modular conveyance apparatus 16 includes a plurality of conveyor subassemblies 34 (only one shown in the figures). Each conveyor subassembly 34 moves the box 14 in the first direction 32 until it is passed to an adjacent conveyor subassembly 34. The last conveyor subassembly 34 of the modular conveyance apparatus 16 moves the box 14 to the tray apparatus 30. Each conveyor subassembly 34 can be operated independent of the other conveyor assemblies 34. Thus, when the automated food preparation system 10 includes multiple boxes 14, each box 14 being at a different station, the boxes 14 need not progress through the automated food preparation system 10 at the same rate.

The tray apparatus 30 is responsible for managing the interface between the automated food preparation system 10 and the recipient of the foodstuff, such as an employee who will interface with a customer or a robotic delivery system that will deliver the foodstuff. The tray apparatus 30 ensures that the automated food preparation system 10 does not prepare foodstuffs at a faster rate than the foodstuffs can be collected from the automated food preparation system 10.

The tray apparatus 30 is also responsible for indicating the identities of the prepared foodstuffs to the recipient. For example, a human recipient may require a human-readable visual indicator of which order the foodstuff was prepared for. Meanwhile, a robotic delivery system may be able to process (i) an electronic signal generated in concert with the foodstuff being placed in a predetermined location by the tray system 30 and/or (ii) a machine-readable visual indicator (such as a barcode).

In FIG. 1, a receipt printer 182 is schematically shown in physical proximity to the tray system 30. The receipt printer 182 may print a receipt indicating the identity of the foodstuff being placed at an output of the tray apparatus 30. Then, a recipient (such as an employee) may retrieve the printed receipt at the same time as the prepared foodstuff to establish the identity of the foodstuff and who the foodstuff was prepared for. In various implementations, the receipt may be capable of indicating that the prepared foodstuff was flawed in some way, prompting the recipient to throw out, compost, or otherwise divert the flawed foodstuff. Control of the automated food preparation system 10 will then re-prepare the foodstuff. This re-preparation may be prioritized over other orders.

With reference to FIGS. 2-5 and 14-20, the tray apparatus 30 is configured to receive the box 14 containing a bun and various toppings/sauces from the last conveyor subassembly 34. While the box 14 is at the tray apparatus 30, seasonings and one or more patties may be disposed onto the bun (via the seasonings apparatus 26 and the grinding and cooking apparatus 28). The tray apparatus 30 may also be configured to move the box 14 containing the bun, various toppings/sauces/seasonings and the one or more patties from the tray apparatus 30 to a shelf or ledge 35 that is located outside the housing 31. In some configurations, a door (not shown) may be coupled to the housing 31 and may be movable between a closed position in which the box 14 is prevented from being moved from the tray apparatus 30 to the shelf 35, and an open position in which the box 14 is allowed to be moved from the tray apparatus 30 to the shelf 35.

Figure 2:
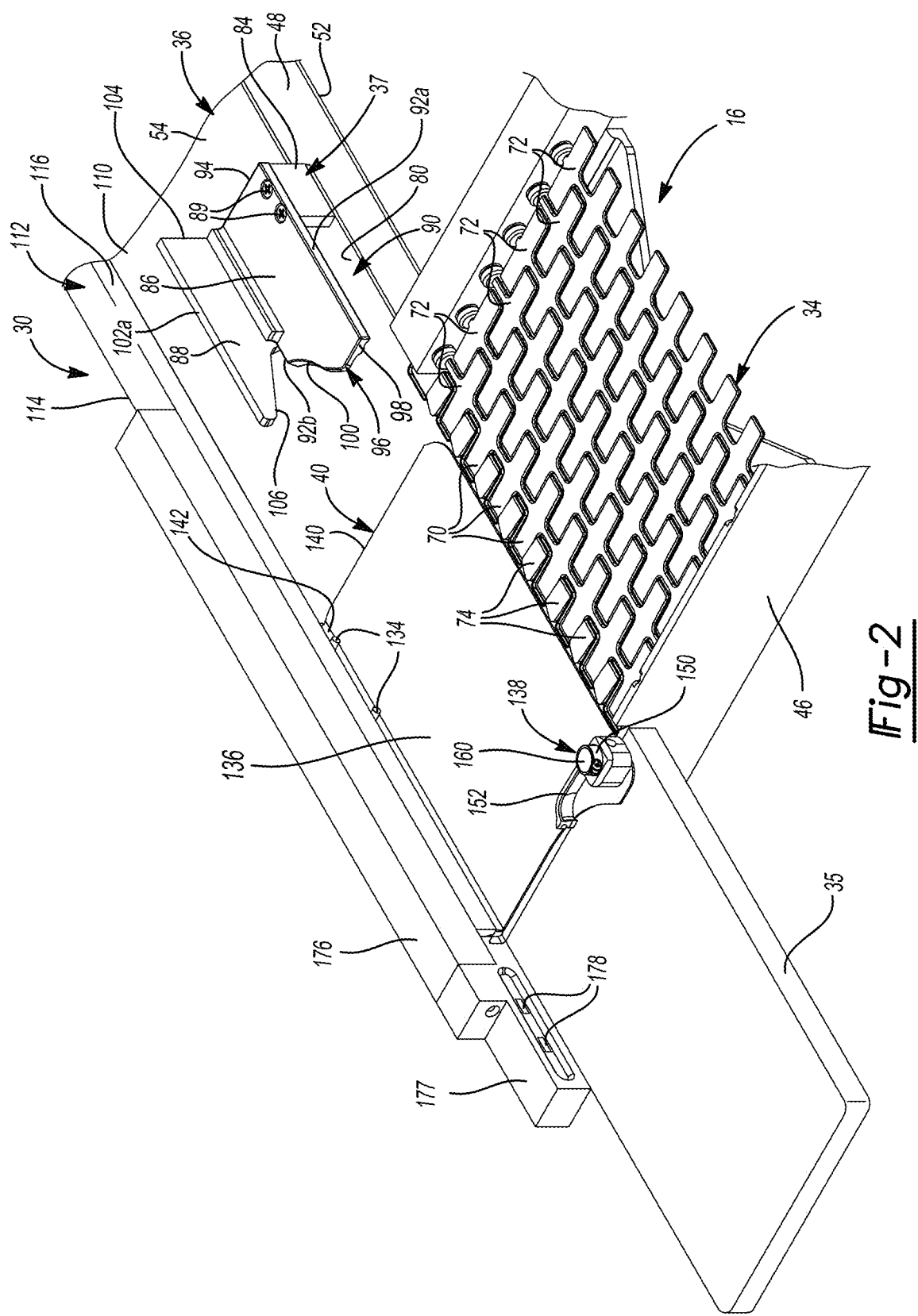
FIG. 2 is a perspective view of a tray apparatus of the food preparation system of FIG. 1.
Figure 3:
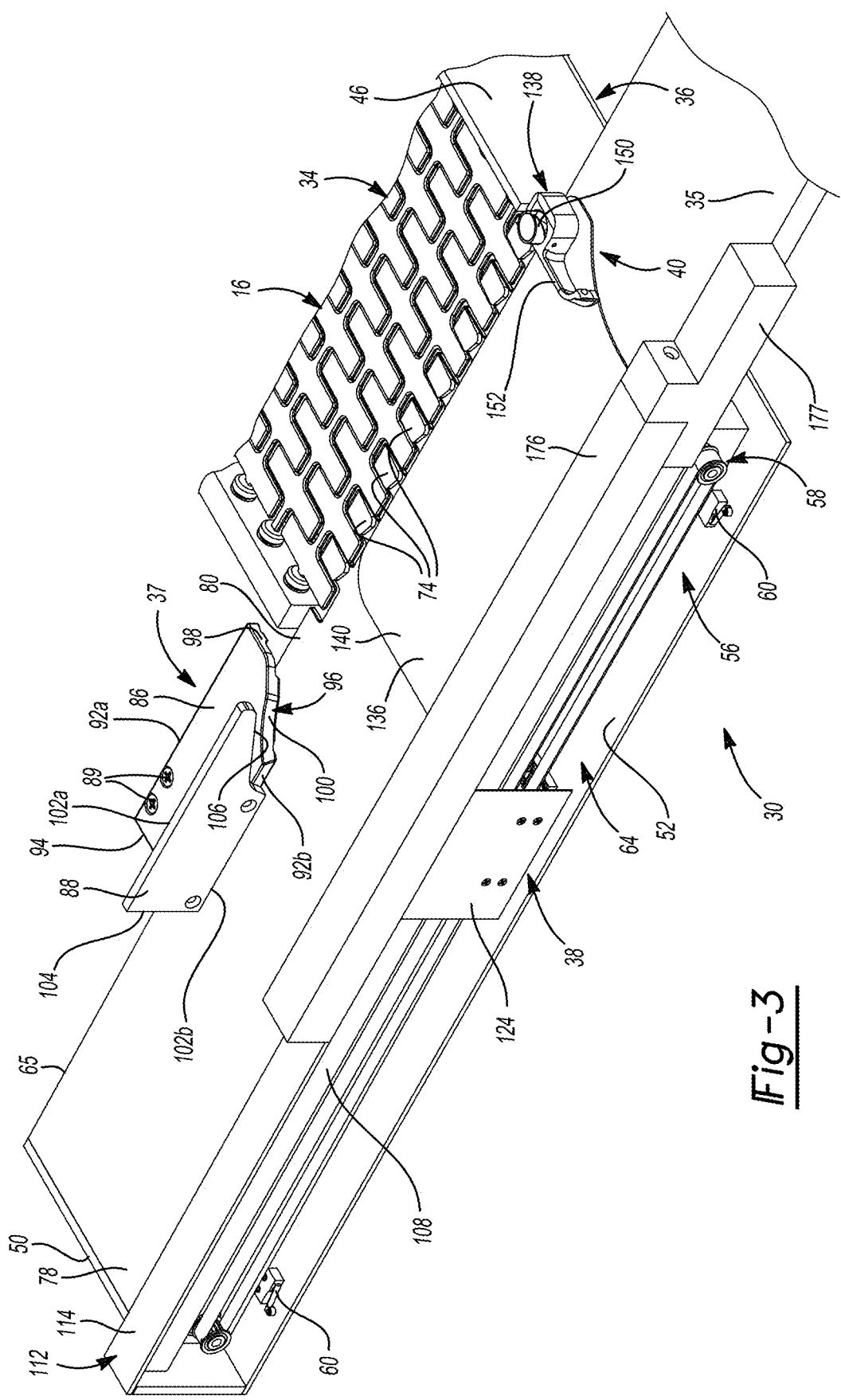
FIG. 3 is another perspective view of the tray apparatus.

With reference to FIGS. 2-20, the tray apparatus 30 includes a housing 36 (FIGS. 2-5 and 14-20), an alignment mechanism 37 (FIGS. 2-5 and 14-20), a sliding mechanism 38 (FIGS. 3-6) and a tray mechanism 40 (FIGS. 2-4 and 11-20). The housing 36 includes a front panel 46, a side panel 48, a rear panel 50, a lower panel 52 and an elongated upper panel or platform 54 that cooperate to define a cavity 56 that houses various electrical and mechanical components such as a belt assembly 58, limit switches 60 and a motor assembly 62, for example. As shown in FIG. 3, the housing 36 also includes an opening 64 at a lateral side thereof that provides access to the cavity 56.

Figure 4:
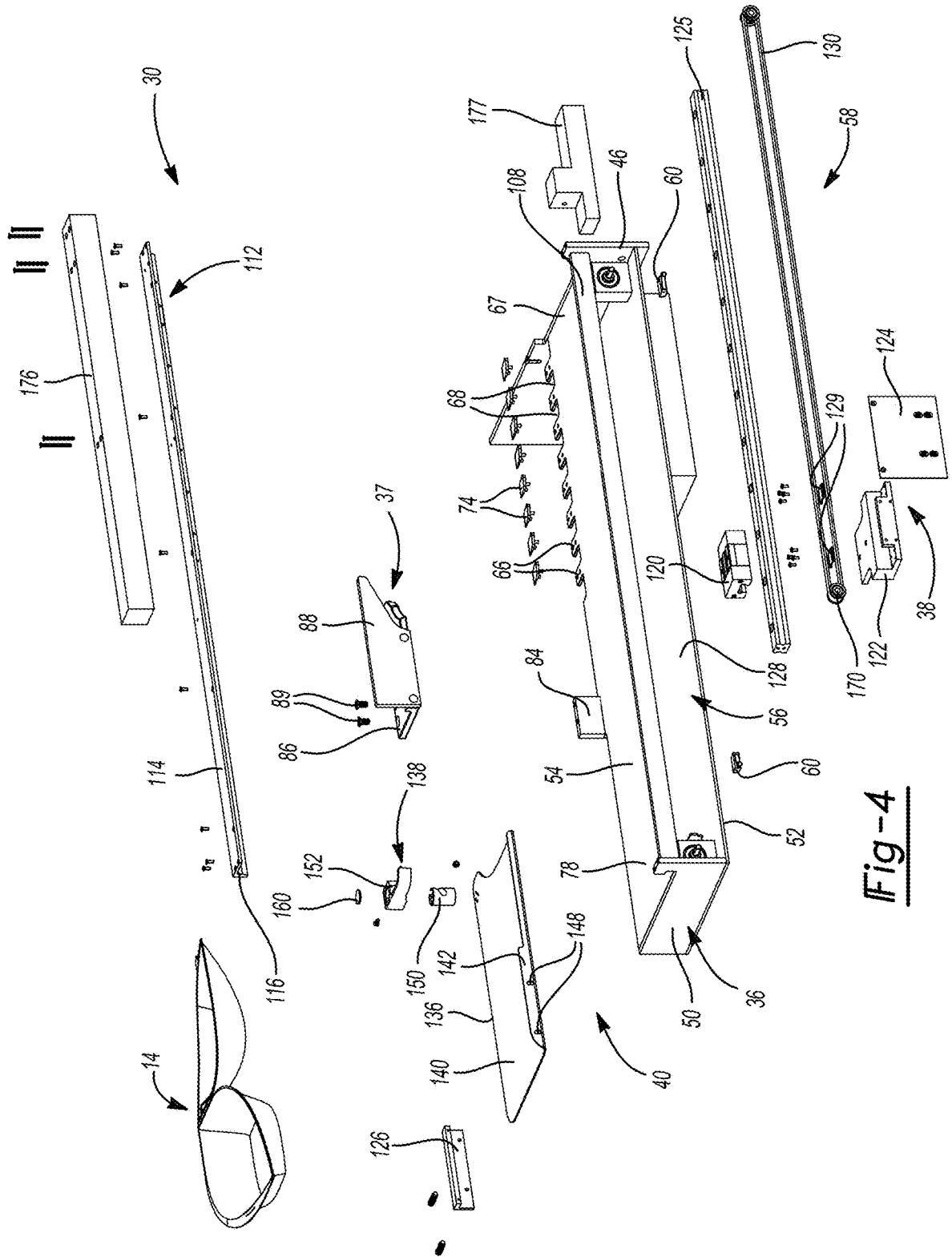
FIG. 4 is an exploded view of the tray apparatus.
Figure 7:
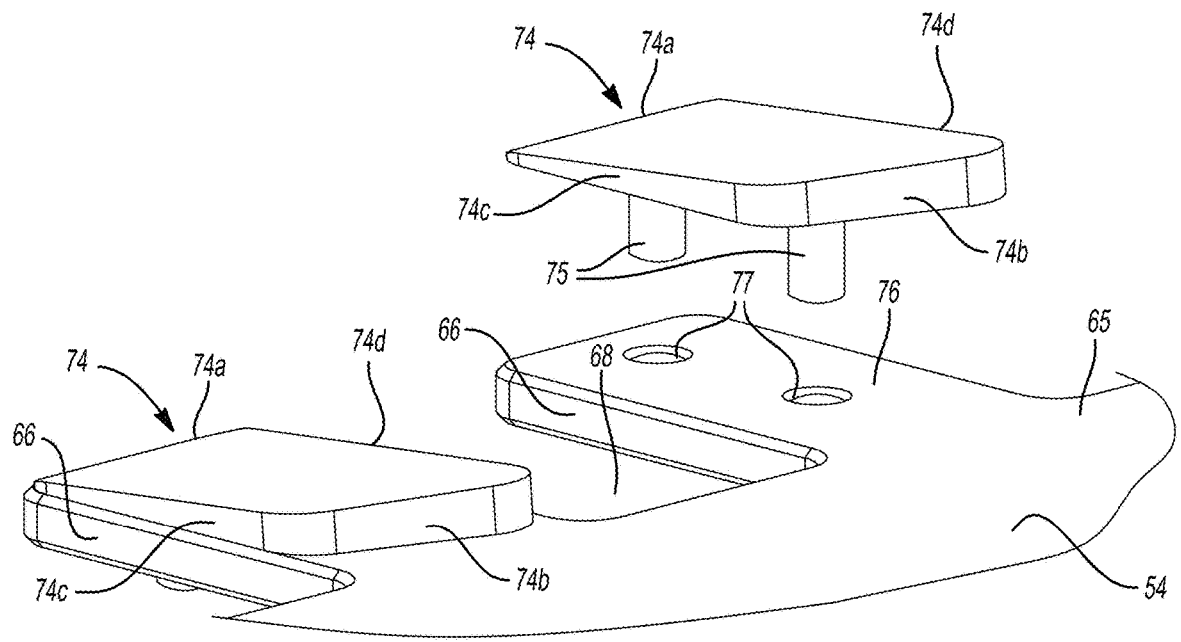
FIG. 7 is a partial perspective view of a platform of the tray apparatus.
Figure 8:
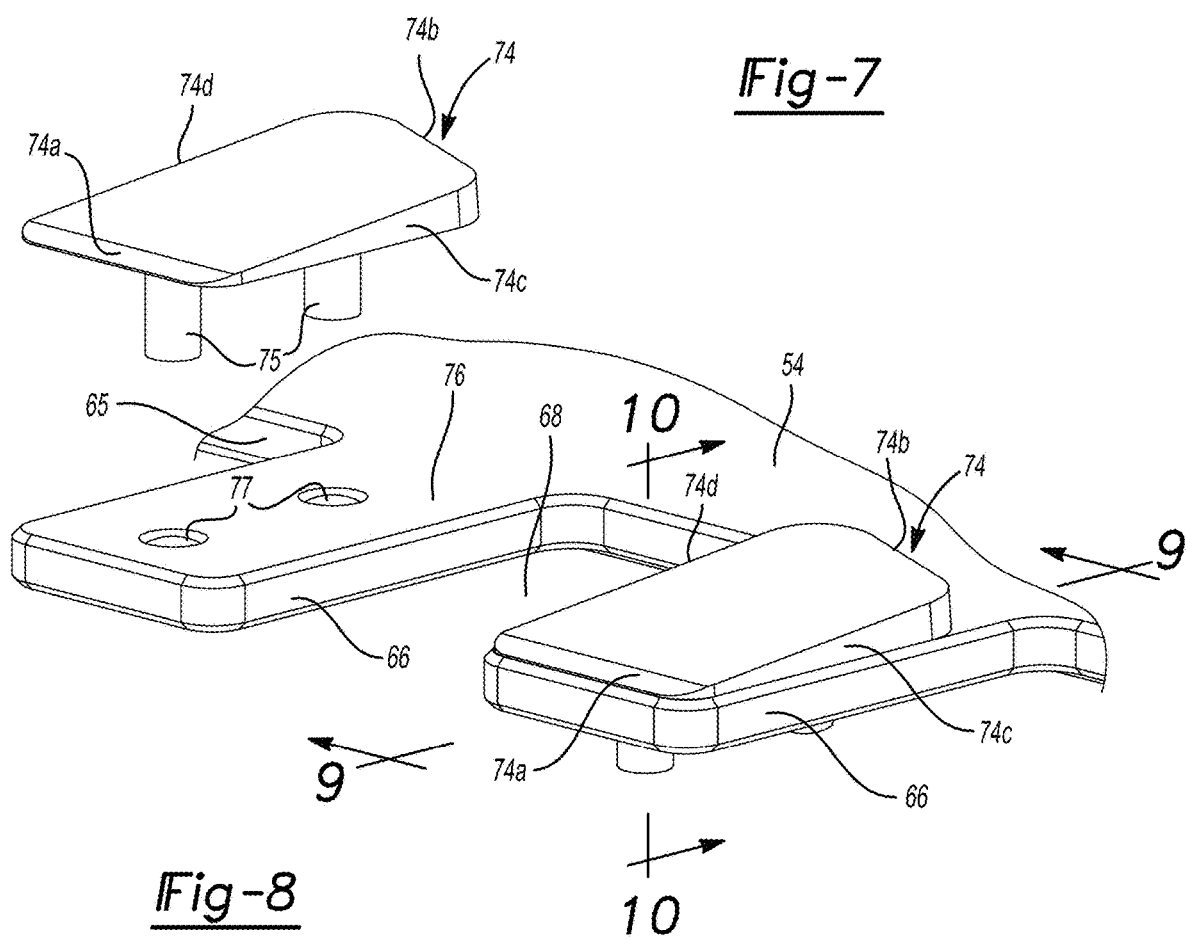
FIG. 8 is another partial perspective view of the platform of the tray apparatus.

As shown in FIGS. 4, 7 and 8, a plurality of tabs 66 are integral with and extend outwardly from a lateral side 65 of the platform 54 near or at a front end 67 thereof. The plurality of tabs 66 are equally spaced apart from each other along a longitudinal direction of the platform 54 (i.e., the longitudinal direction of the platform 54 extends perpendicular to the longitudinal direction of the modular conveyance apparatus 16). Stated another way, the tabs 66 are separated by gaps 68 such that the tabs 66 and the gaps 68 are arranged in an alternating fashion. The gaps 68 may accommodate blades 70 of a paddle 72 of the last conveyor subassembly 34. That is, the blades 70 are received in the gaps 68 when the paddle 72 is in a horizontal orientation and are allowed to rotate through the gaps 68 when the paddle 72 rotates to move or transport the box 14 from the last conveyor subassembly 34 to the tray apparatus 30.

Figure 9:
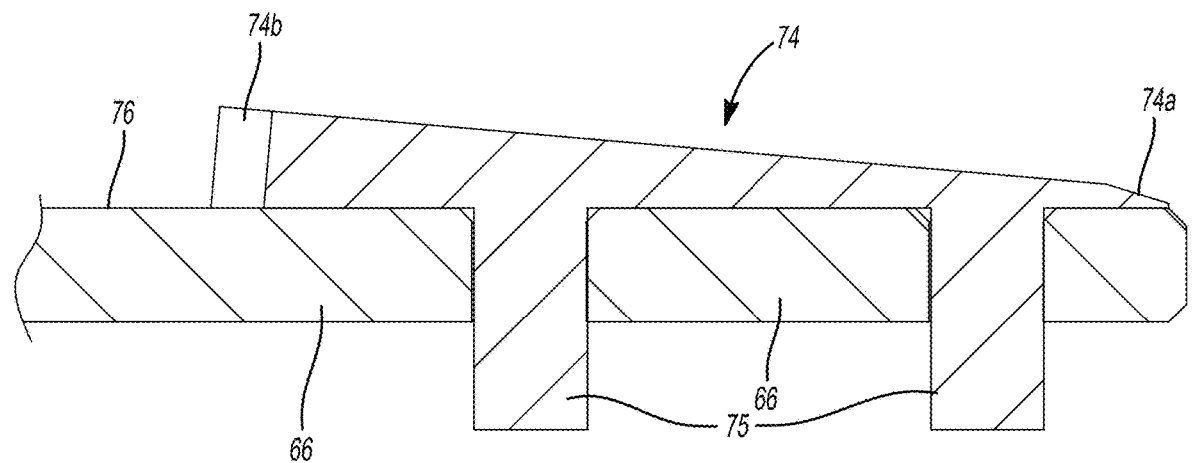
FIG. 9 is a cross-sectional view of the platform taken along line 9-9 in FIG. 8.
Figure 10:
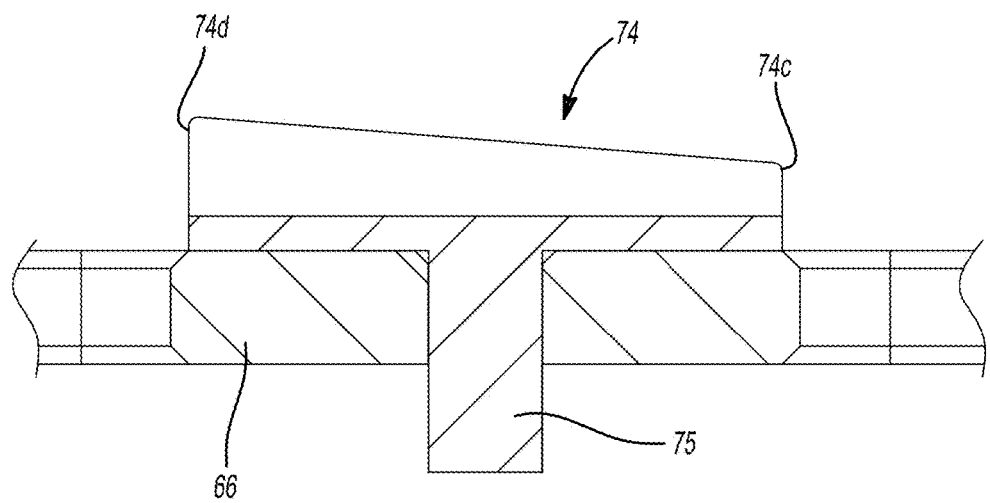
FIG. 10 is a cross-sectional view of the platform taken along line 10-10 in FIG. 8.

With reference to FIGS. 2-4, 7-10 and 14-20, a guide member or ramp 74 is attached to a top surface 76 of a respective tab 66. That is, each guide member 74 has projections 75 that are snugged into openings 77 of the respective tab 66. In some configurations, the guide members 74 may be attached to the tabs 66 by adhesives, mechanical attachments, or any other suitable means. As shown in FIGS. 7-9, the guide member 74 inclines upwardly from a first end 74a thereof (i.e., the first end is at the distal end of the tab 66) toward a second end 74b thereof (i.e., the second end is at the proximal end of the tab 66). Stated another way, the guide member 74 inclines upwardly from the first end 74a positioned away from the platform 54 to the second end 74b positioned adjacent to the platform 54 (relative to the first end 74a). As shown in FIGS. 7 and 10, the guide member 74 also inclines upwardly from a first side 74c thereof (the first side 74c facing the rear end 78 of the platform 54) toward a second side 74d (the second side 74d facing a front end 67 of the platform 54). In this way, the box 14 moves upwardly and toward the rear end 78 of the platform 54 as it is moved or transported from the last conveyor subassembly 34 to the tray mechanism 40. As shown in FIGS. 2 and 3, for example, a lip 80 is integral with and extends outwardly from the lateral side 65 of the platform 54 at or near a middle portion thereof (i.e., the lip 80 is positioned further toward the rear end 78 of the platform 54 relative to the tabs 66).

Figure 14:
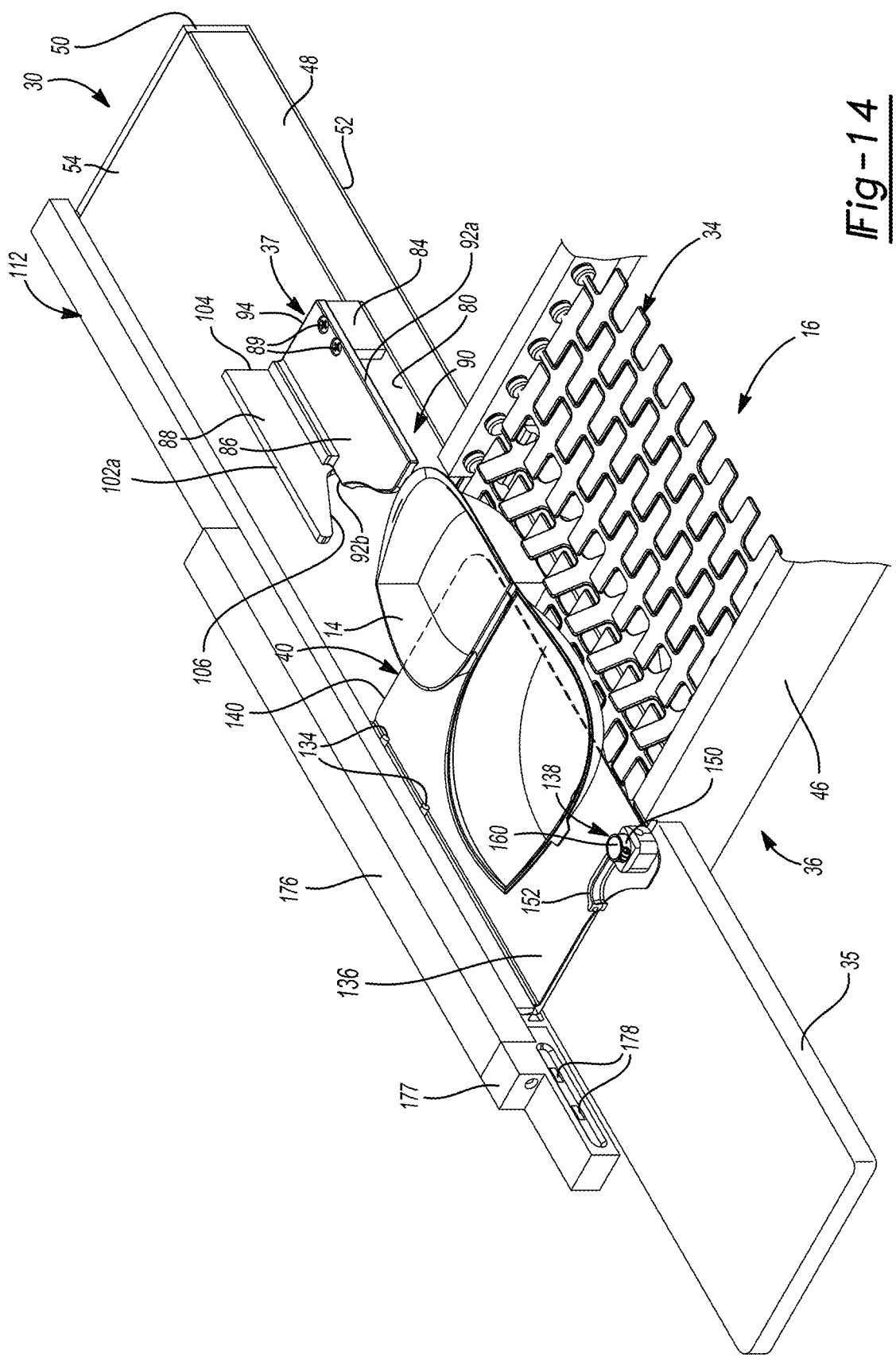
FIG. 14 is a perspective view of the tray apparatus with a box being transported thereto from a conveyance apparatus.
Figure 15:
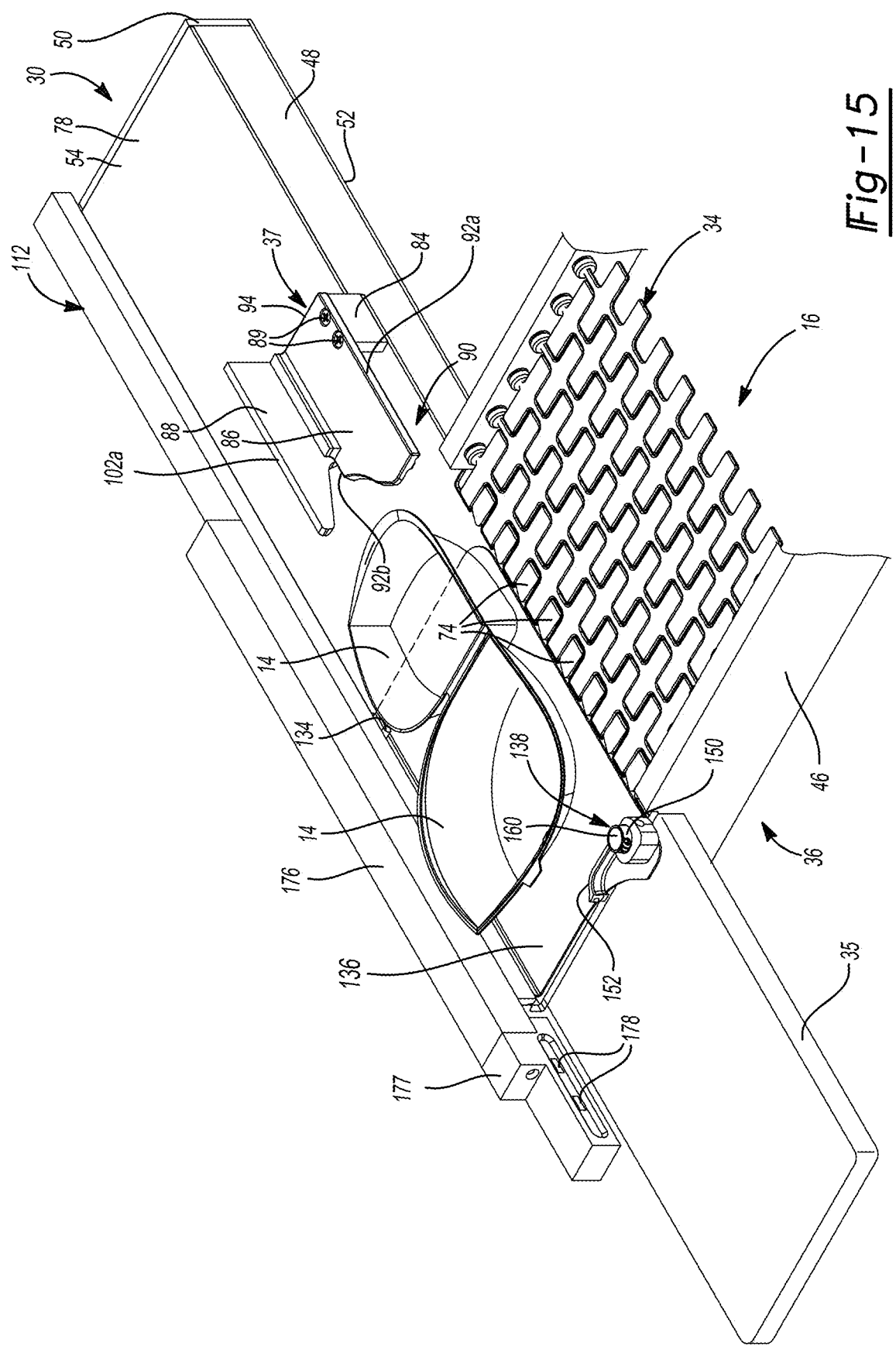
FIG. 15 is a perspective view of the tray apparatus with the box disposed on the tray mechanism and the tray mechanism in a first position.
Figure 16:
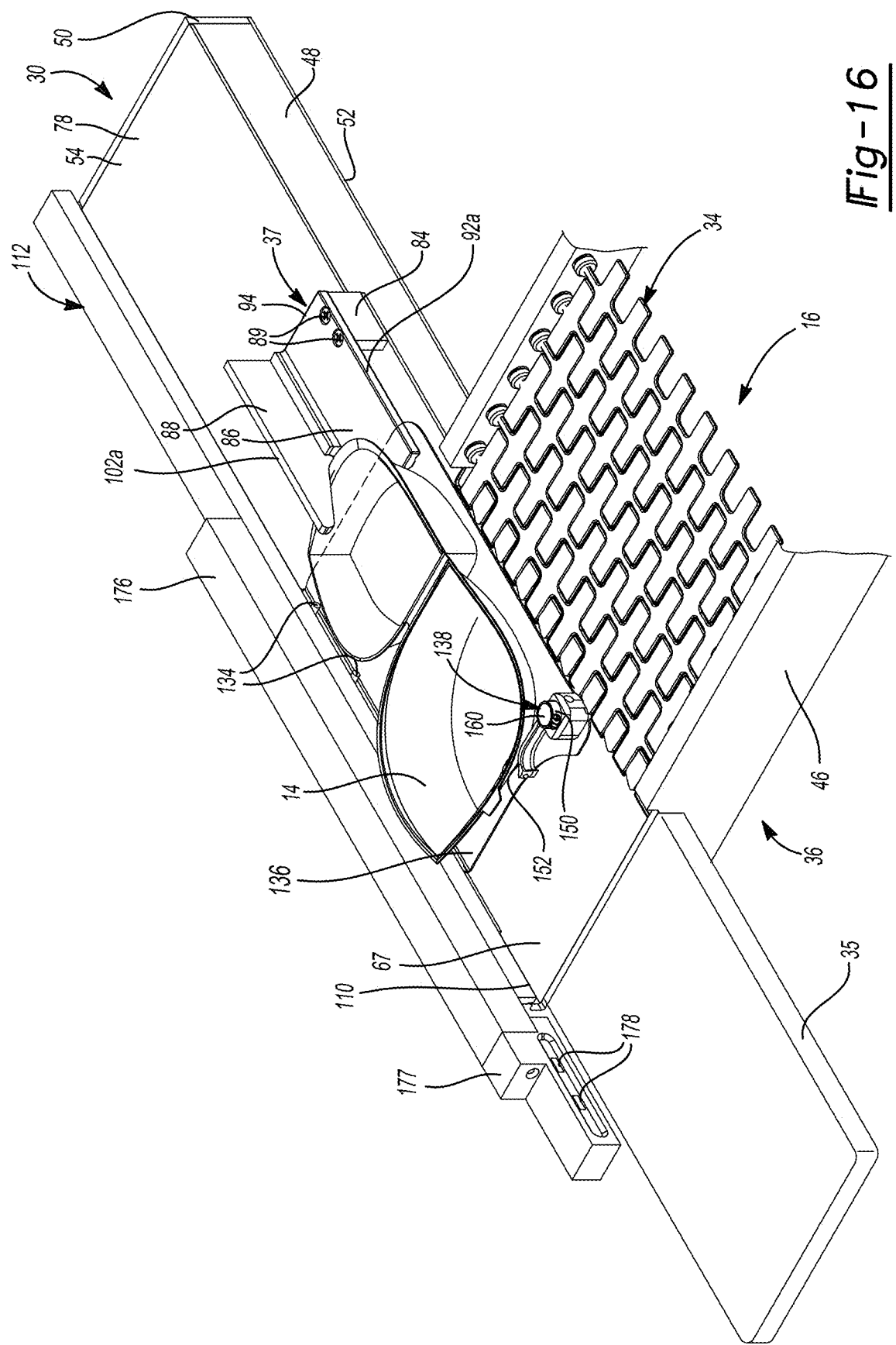
FIG. 16 is a perspective view of the tray apparatus with the box and the tray mechanism moving toward a second position.
Figure 17:
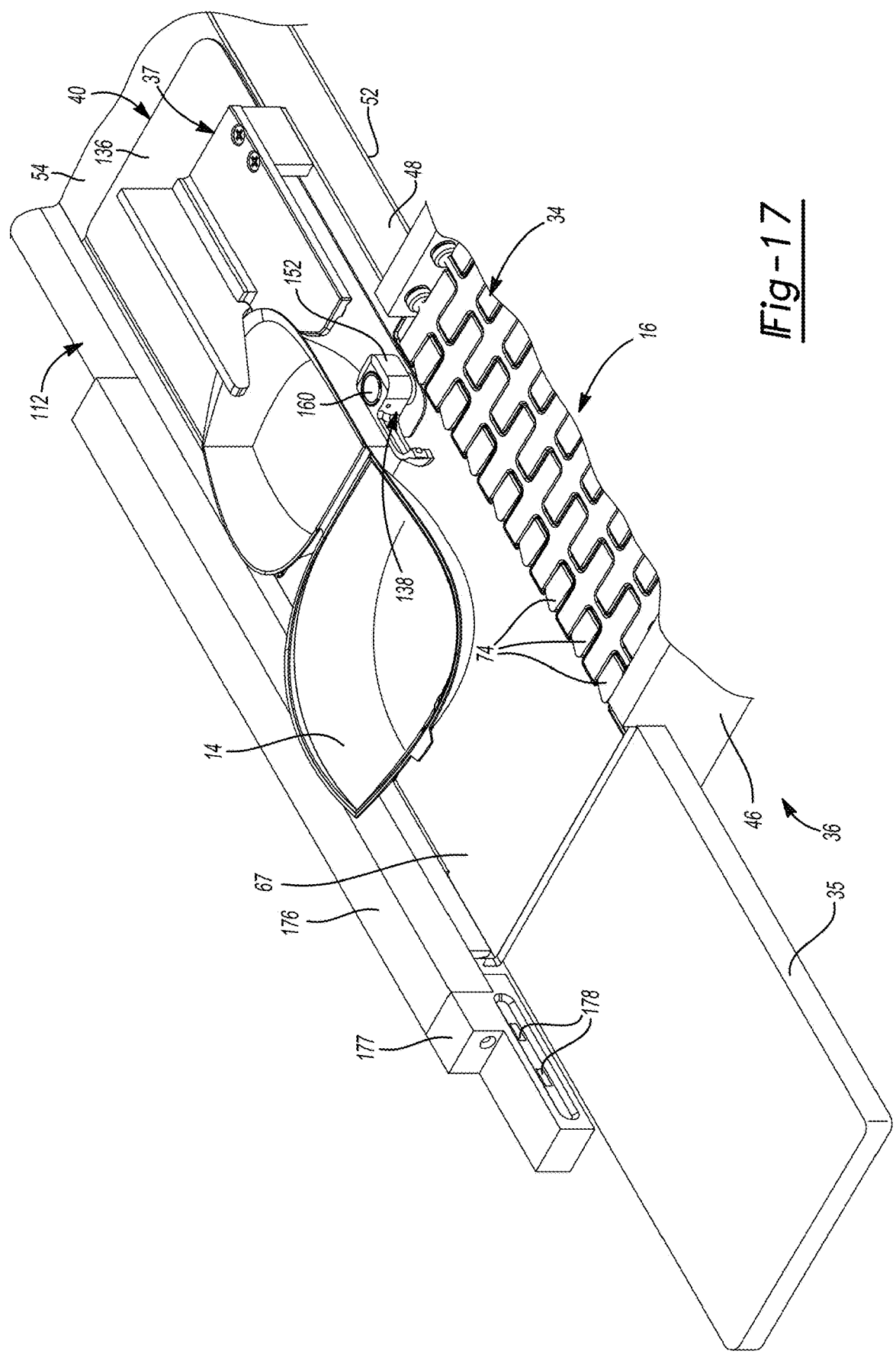
FIG. 17 is a perspective view of the tray apparatus with the box contacting an alignment mechanism of the tray apparatus as the tray mechanism moves toward the second position.
Figure 18:
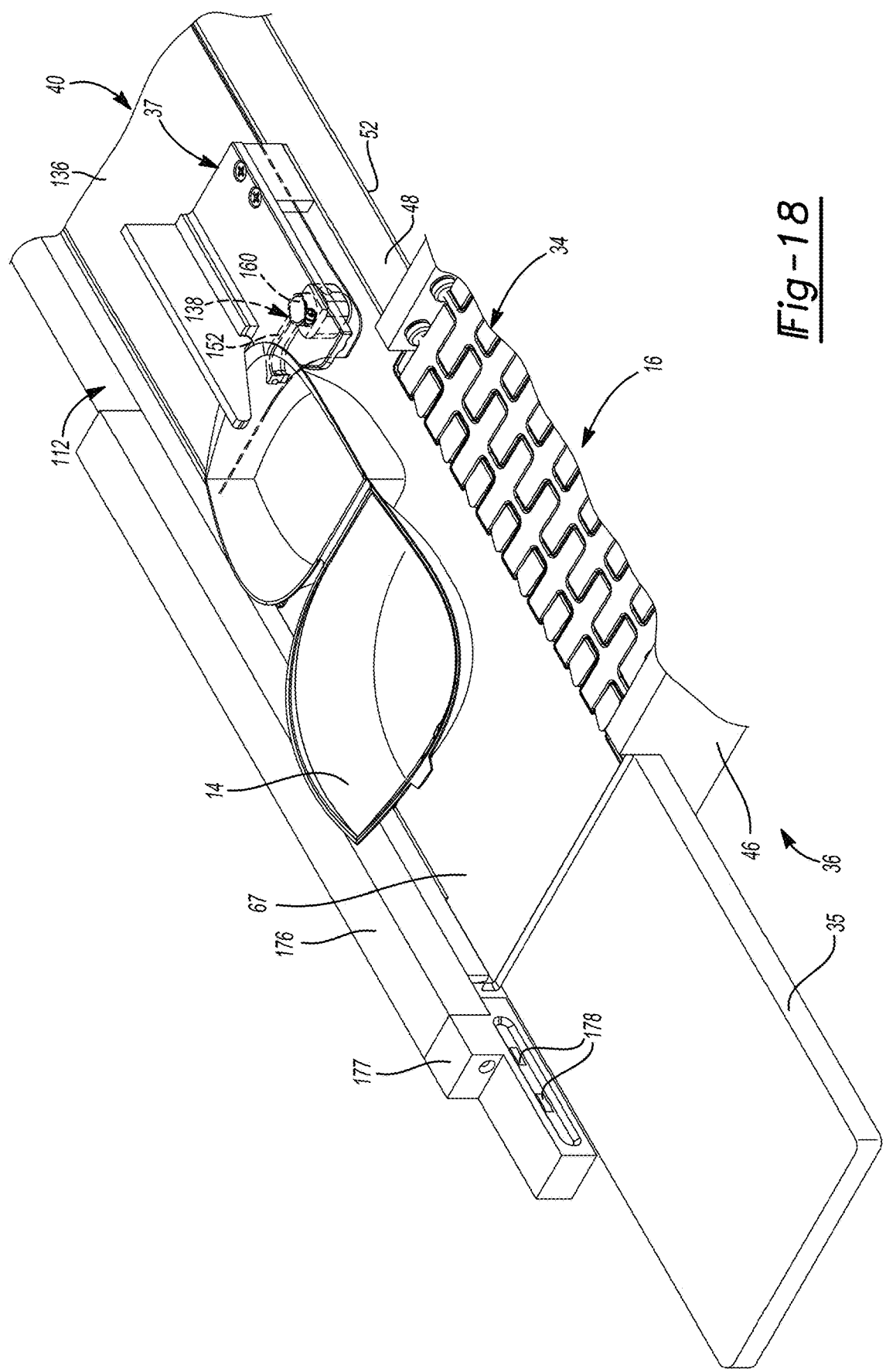
FIG. 18 is a perspective view of the tray apparatus with the tray mechanism in the second position.

As shown in FIGS. 2, 3 and 14-20, the alignment mechanism 37 is mounted to the lip 80 and is configured to align the box 14 relative to the platform 54. The alignment mechanism 37 is also configured to stop or otherwise prevent the box 14 from moving toward the rear end 78 of the platform 54 (FIGS. 16-18). The alignment mechanism 37 includes a support plate 84, a guide plate 86 and a stopping plate 88.

With reference to FIGS. 2, 3, 14 and 15, the support plate 84 is rectangular-shaped and extends upwardly from an end of the lip 80. The guide plate 86 is attached to the support plate 84 via fasteners 89 so that the guide plate 86 extends over the platform 54 and defines a space 90 between the platform 54 and the guide plate 86. The space 90 can accommodate the tray mechanism 40. The guide plate 86 has first and second side surfaces 92a, 92b, a first or rear end surface 94 and a second or front end surface 96. The first and second side surfaces 92a, 92b are straight and are opposed to each other. The first side surface 92a has a length that is longer than a length of the second side surface 92b. The rear end surface 94 faces toward the rear end 78 of the platform 54 and is straight. The front end surface 96 faces toward the front end 67 of the platform 54 and has a first portion 98 and a second portion 100. The first portion 98 is straight and extends from an end of the first side surface 92a to the second portion 100. The second portion 100 is curved and extends from an end of the first portion 98 to an end of the second side surface 92b.

With reference to FIGS. 2, 3, 14 and 15, the stopping plate 88 is attached to the second side surface 92b of the guide plate 86 via fasteners (not shown) and includes upper and lower surfaces 102a, 102b, a rear end surface 104 and a curved surface 106. The upper and lower surfaces 102a, 102b are straight and are opposed to each other. The upper surface 102a has a length that is longer than a length of the lower surface 102b. The rear end surface 104 faces toward the rear end 78 of the platform 54 and is straight. The curved surface 106 extends from the upper surface 102a to the lower surface 102b.

Figure 5:
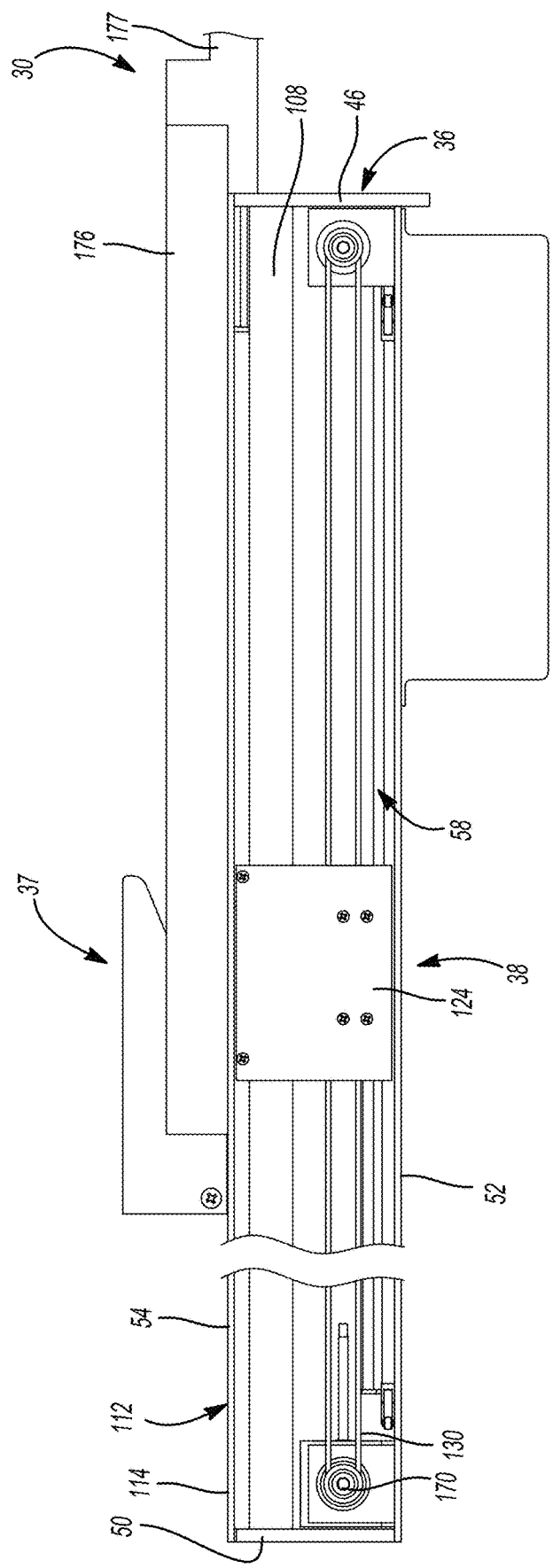
FIG. 5 is a side view of the tray apparatus.

As shown in FIGS. 4 and 5, an elongated member 108 extends upwardly from a lateral side 110 of the platform 54 that is opposite the lateral side 65. The elongated member 108 extends between the front panel 46 and rear panel 50 of the housing 36. An L-shaped elongated member 112 is attached to the front panel 46, the rear panel 50 and the elongated member 108. The elongated member 112 includes a first section 114 and a second section 116 that extends perpendicularly from the first section 114. The first section 114 is attached to the front panel 46, the rear panel 50 and the elongated member 108.

Figure 6:
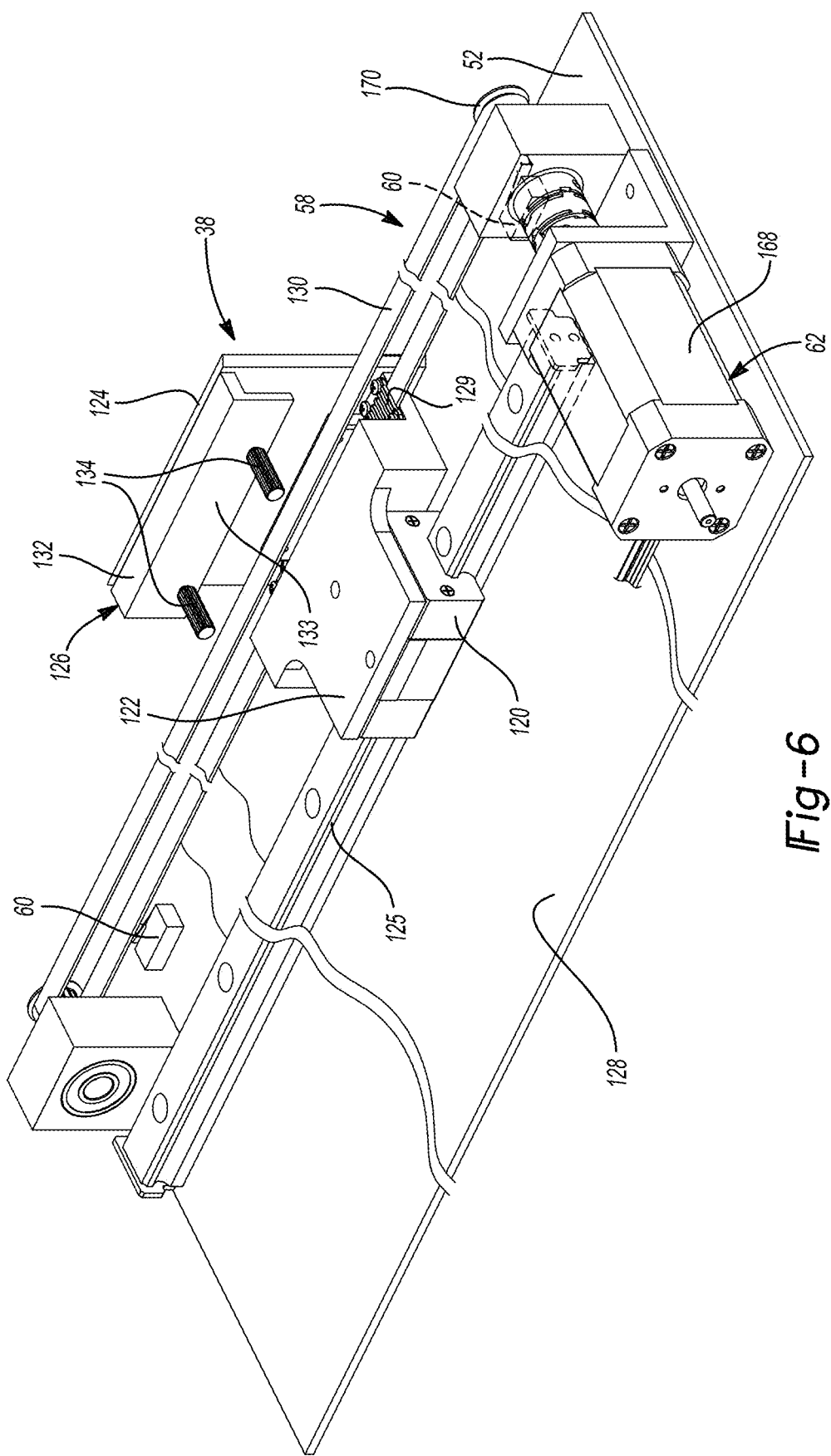
FIG. 6 is a perspective view of a sliding mechanism of the tray apparatus.

The sliding mechanism 38 is engaged to the belt assembly 58 (FIGS. 3, 5 and 6) and the tray mechanism 40, and is configured to move (or traverse) in the longitudinal direction of the housing 36 between a first position in which the sliding mechanism 38 is near the front end 67 of the platform 54 and a second position in which the sliding mechanism 38 is near the rear end 78 of the platform 54. As shown in FIGS. 4 and 6, the sliding mechanism 38 includes a rail body 120, a belt body 122, an attachment plate 124 and a connecting plate 126. The rail body 120 is attached to the belt body 122 and is slidably disposed on a rail 125. The rail body 120, the belt body 122 and the rail 125 are disposed within the cavity 56 of the housing 36. The rail 125 extends along the longitudinal direction of the housing 36 and is attached to a top surface 128 of the lower panel 52. The rail 125 supports the sliding mechanism 38 (i.e., the rail body 120 and the belt body 122 do not contact or touch the top surface 128 of the lower panel 52). Belt engaging members 129 are attached to the belt body 122 and are engaged with a belt 130 of the belt assembly 58. In this way, rotation of the belt 130 causes movement of the belt body 122 along the belt 130 in the longitudinal direction of the housing 36, which, in turn, causes the rail body 120 to move (or slide) along the rail 125.

The attachment plate 124 is disposed outside the cavity 56 of the housing 36 and is attached to the belt body 122 and the connecting plate 126. The L-shaped connecting plate 126 is attached to the tray mechanism 40 and includes a first section 132 and a second section 133 extending perpendicularly from the first section 132. A plurality of protrusions 134 are integral with and extend outwardly from the second section 133. The plurality of protrusions 134 are spaced apart from each other and are attached to the tray mechanism 40.

The tray mechanism 40 is configured to receive the box 14 containing a bun and various toppings/sauces from the last conveyor subassembly 34. The tray mechanism 40 is also configured to move the box 14 containing the bun, various toppings/sauces/seasonings and the one or more patties from the platform 54 to the shelf or ledge 35. The tray mechanism 40 is attached to the protrusions 134 of the connecting plate 126 such that the tray mechanism 40 moves in the longitudinal direction of the housing 36 when the sliding mechanism 38 moves between the first and second positions. As shown in FIGS. 2-4 and 11-20, the tray mechanism 40 includes a tray or plate 136 and an arm assembly 138 attached to the plate 136.

The plate 136 is made of a metallic material and includes a rectangular-shaped plate portion 140 and a flange 142 extending upwardly from a side of the plate portion 140. The plate portion 140 is configured to receive the box 14 from the last conveyor subassembly 34. Some or all of a bottom surface 146 of the plate portion 140 may include a low-friction coating, such as Teflon®, to facilitate moving (or sliding) along the platform 54. That is, at least a portion of the tray mechanism 40 may move (or slide) along the platform 54 (i.e., contacting the platform 54) in the longitudinal direction thereof when the sliding mechanism 38 moves between the first and second positions. In some configurations, the platform 54 may include the Teflon® coating, in addition to, or instead of, the bottom surface 146 of the plate portion 140. The flange 142 includes openings 148 that the protrusions 134 extend through, thereby attaching the sliding mechanism 38 and the plate 136 to each other in a cantilevered fashion.

With reference to FIGS. 2-4 and 11-20, the arm assembly 138 is attached to the plate 136 at a front end thereof. The arm assembly 138 is also attached to the plate 136 at or near a corner thereof. The arm assembly 138 is made of a metallic material and includes a cylindrical-shaped post 150 and a unitary arm 152. The post 150 is fixedly coupled to the plate 136 and includes a slot 154 having a generally corkscrew or helical shape. A bearing 156 is received in the slot 154 and a fastener 158 extends through the bearing 156 and attaches to the arm 152, thereby attaching the post 150 and the arm 152 to each other. In other implementations, the unitary arm 152 may be motivated by a spring. The corkscrew mechanism may be preferable due to food safety codes, which may require heightened or more complicated cleaning protocols for mechanisms using springs.

With reference to FIGS. 2-4 and 11-20, the arm 152 is rotatably coupled to the post 150 between a first position (FIGS. 2, 3, 11, 13-16 and 18-20) in which the arm 152 is positioned at or near a bottom end of the post 150 and a second position (FIG. 17) in which the arm 152 is positioned at or near at a top end of the post 150. In other words, the arm 152 moves upwardly along the post 150 when rotating from the first position toward the second position. A cap 160 is attached to the post 150 at the top end thereof and acts as a stop to the bearing 156 and the fastener 158 (i.e., prevents the bearing 156 and the fastener 158 from being removed from the slot 154). That is, the bearing 156 and the fastener 158 traverse the slot 154 when the arm 152 rotates between the first and second positions. When in the first position, the arm 152 extends perpendicular to the longitudinal direction of the housing 36. When in the second position, the arm 152 extends parallel to the longitudinal direction of the housing 36. It should be understood that the arm 152 is rotatable only in a single direction. That is, the bearing 156 and the fastener 158 will abut against the post 150 and prevent the arm 152 from rotating in the opposite direction. For example, the arm 152 rotates about the post 150 only in a clockwise direction, and is prevented from rotating about the post 150 in a counter-clockwise direction.

Figure 11:
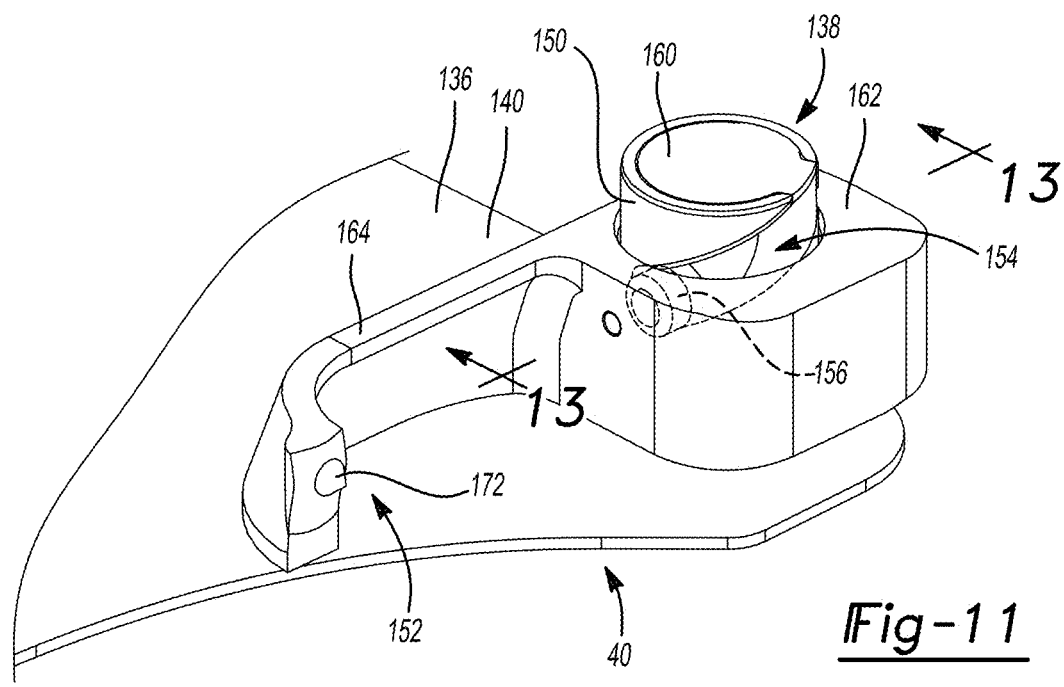
FIG. 11 is a partial perspective view of a tray mechanism of the tray apparatus.
Figure 12:
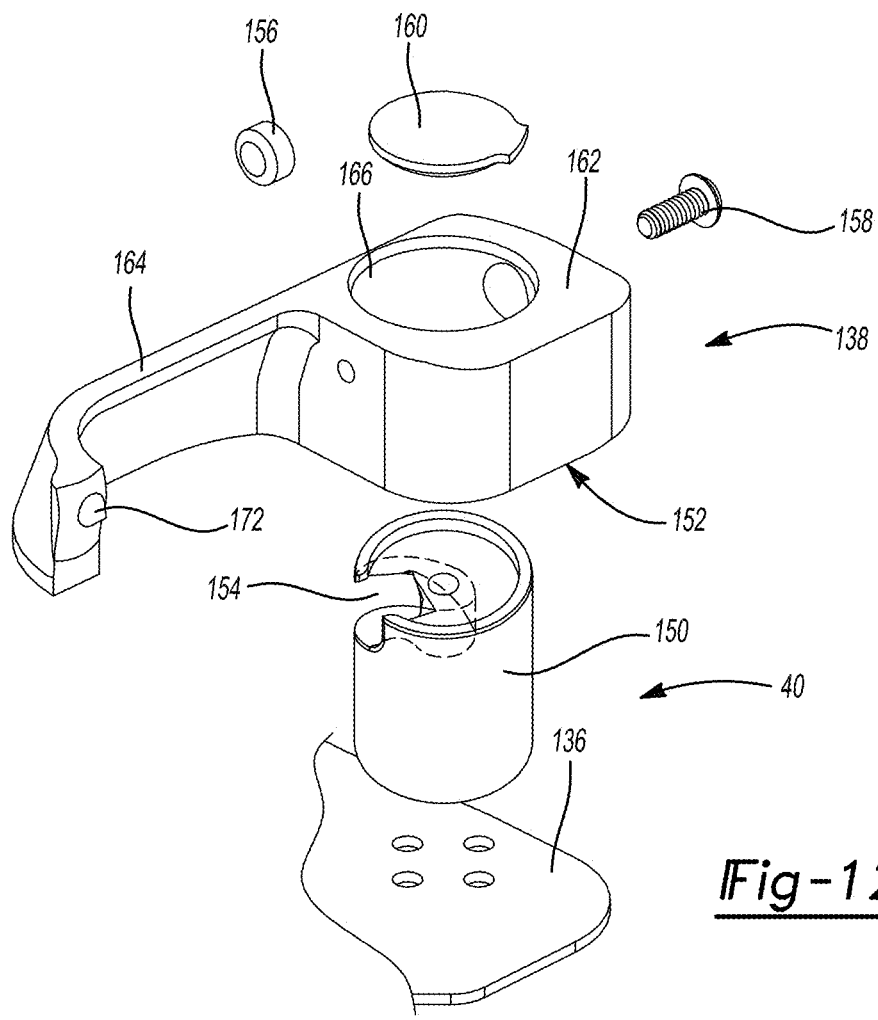
FIG. 12 is a partially exploded view of the tray mechanism.
Figure 13:
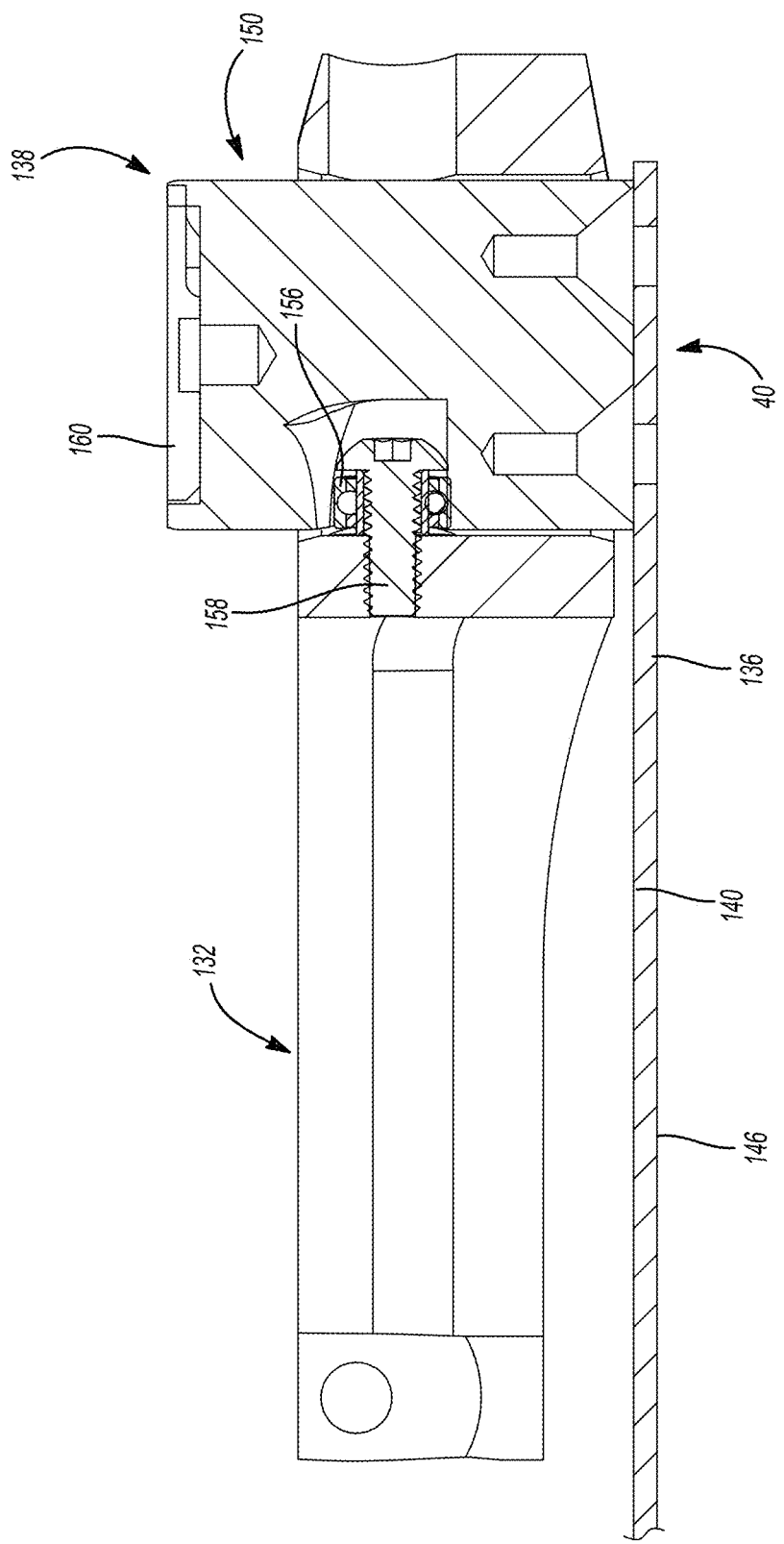
FIG. 13 is a cross-sectional view of the tray mechanism taken along line 13-13 in FIG. 11.

With reference to FIGS. 11-13, the arm 152 includes a base portion 162 and an arm portion 164. The base portion 162 defines an opening 166 that receives the post 150. The fastener 158 extends through the bearing 156 and at least partially through the base portion 162, thereby attaching the post 150 and the arm 152 to each other. The arm portion 164 is generally L-shaped and extends from the base portion 162.

With continued reference to FIGS. 1-20, operation of the tray apparatus 30 will be described in detail. As shown in FIGS. 14 and 15, the plate portion 140 is configured to receive one box 14 containing a bun and various toppings/sauces from the last conveyor subassembly 34. Once the one box 14 is positioned on the plate portion 140, a motor 168 drives a pulley 170 of the belt assembly 58 in a first rotational direction, which, in turn, causes the sliding mechanism 38 to move from the first position toward a second position in the longitudinal direction of the housing 36. As shown in FIGS. 16-18, when the sliding mechanism 38 moves from the first position toward the second position, the tray mechanism 40 moves toward the rear end 78 of the platform 54 in a longitudinal direction of the housing 36. As the tray mechanism 40 moves toward the rear end 78 of the platform 54, the one box 14 contacts and rides along the section portion 100 of the front end surface 96 of the guide plate 86, which causes the one box 14 to move toward the lateral side 110 of the platform 54. As the one box 14 rides along the section portion 100 of the front end surface 96, the one box 14 eventually abuts against the stopping plate 88, which prevents the one box 14 from moving further toward the rear end 78 of the platform 54 along with the tray mechanism 40 and removes the one box 14 from the plate portion 140.

When the one box 14 contacts the stopping plate 88 and is prevented from moving further toward the rear end 78 of the platform 54 along with the tray mechanism 40, the arm 152 contacts the one box 14 and rotates from the first position to the second position. The arm 152 remains in the second position until the arm 152 passes the one box 14, which, at that point, the arm 152 rotates back to the first position (FIG. 18). While the one box 14 is abutting against the stopping plate 88, seasonings and one or more patties can be added onto the bun (via the seasonings apparatus 26 and the grinding and cooking apparatus 28).

Figure 19:
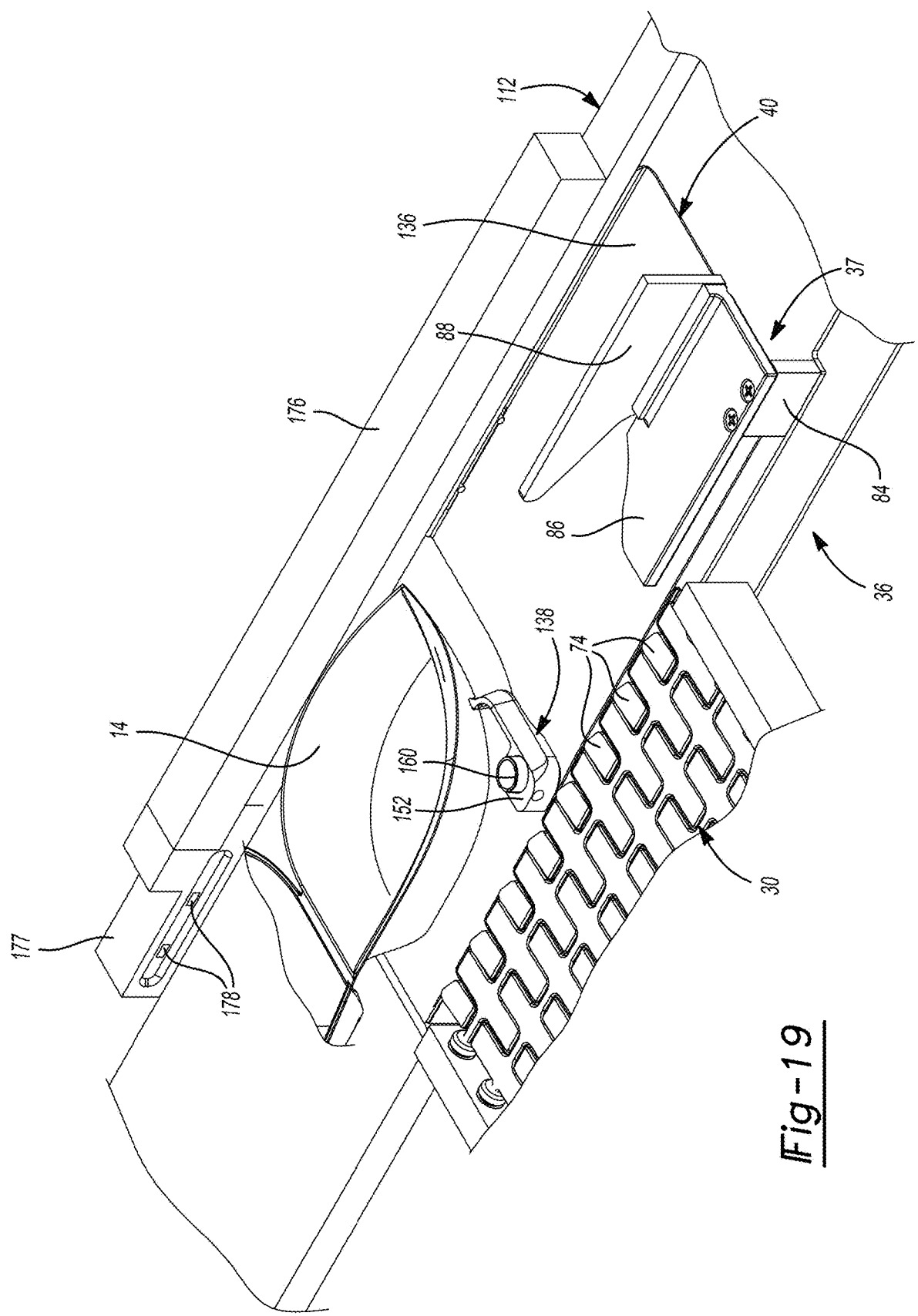
FIG. 19 is a perspective view of the tray apparatus with the tray mechanism moving from the second position toward the first position and moving the box toward a pick-up ledge.

Once the seasonings and the one or more patties are added onto the bun, the motor 168 drives the pulley 170 in a second rotational direction, which, in turn, causes the sliding mechanism 38 to move from the second position toward the first position in the longitudinal direction of the housing 36. As shown in FIGS. 19 and 20, when the sliding mechanism 38 moves from the second position toward the first position, the tray mechanism 40 moves toward the front end 67 of the platform 54 in the longitudinal direction of the housing 36. As the tray mechanism 40 moves toward the front end 67 of the platform 54, a protrusion 172 extending from the arm 152 contacts the one box 14 and moves the one box 14 through the opening 174 in the housing 31 and out onto the ledge 35. A mounting plate 176 is attached to the elongated member 112 and further guides the one box 14 out onto the ledge 35. Stated another way, the mounting plate 176 prevents the one box 14 from rotating as it is being moved out onto the ledge 35.

A sensor housing 178 is attached to the mounting plate 176 and includes one or more sensors 178 disposed therein. In various implementations, two sensors 178 are implemented for redundancy. The sensors 178 may be optical sensors, for example, that scan the ledge 35 to detect whether a box 14 is on the ledge 35. For example, if any of the sensors 178 detect a box 14 on the ledge 35, the tray apparatus 30 is prevented from moving another box 14 out onto the ledge 35. It should be understood that the limit switches 60 may be positioned at opposing ends of the lower panel 52 to prevent movement of the sliding mechanism 38 (and the tray mechanism 40) past predetermined points.

Although the present disclosure describes the conveyance apparatus 16 as being modular, it should be understood that a conventional conveyor belt may also be used as the conveyance apparatus 16.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A tray apparatus comprising:
an elongated platform; and
a tray mechanism including:
  a plate disposed onto, and configured to translate linearly relative to, the platform; and
  an arm assembly coupled to the plate and including a post and an arm, wherein:
  the post is fixedly coupled to the plate and extends upwardly therefrom,
  the arm is rotatably coupled to the post between a first position and a second position,
  the plate is configured to receive a box containing foodstuffs from a conveyance apparatus,
  the plate is movable between first and second states,
  the plate moves in a first longitudinal direction of the platform when moving from the first state toward the second state,
  the plate moves in a second longitudinal direction of the platform that is opposite the first longitudinal direction when moving from the second state toward the first state,
  the arm is configured to contact the box and rotate from the first position toward the second position when the plate is moving from the first state toward the second state, and
  the arm is configured to contact and move the box in the second longitudinal direction along the platform when the plate moves from the second state toward the first state.

2. The tray apparatus of claim 1, wherein the post includes a slot having a helical shape.

3. The tray apparatus of claim 2, further comprising:
a bearing and a fastener at least partially disposed in the slot, wherein the fastener extends through the bearing and attaches to the arm so that the bearing and the arm translates in the slot as the arm moves between the first and second positions.

4. The tray apparatus of claim 3, wherein:
the arm assembly includes a cap attached to an end of the platform, and
the cap acts as a stop to prevent the bearing and the fastener from being removed from the slot.

5. The tray apparatus of claim 1, wherein the arm extends:
perpendicular to the first longitudinal direction of the platform when in the first position, and
parallel to the first longitudinal direction of the platform when in the second position.

6. The tray apparatus of claim 1, wherein the arm is permitted to rotate in a clockwise direction and prevented from rotating in a counter-clockwise direction.

7. The tray apparatus of claim 1, wherein the arm is near or at a lower end of the post when in the first position and near or at an upper end of the post when in the second position.

8. The tray apparatus of claim 1, further comprising:
an alignment mechanism attached to the platform, wherein the alignment mechanism includes:
a guide plate configured to contact and move the box laterally when the plate is moving from the first state toward the second state, and
a stopping plate attached to the guide plate and configured to contact and prevent the box from moving further in the first longitudinal direction when the plate moves from the first state toward the second state.

9. The tray apparatus of claim 8, wherein the guide plate and the platform cooperate to define a space that accommodates the arm assembly when the plate is moving between the first and second states.

10. The tray apparatus of claim 1, further comprising:
a plurality of tabs integral with and extending outwardly from a lateral side of the platform,
wherein the plurality of tabs is configured to interface with the conveyance apparatus.

11. The tray apparatus of claim 10, further comprising:
guide members attached to the plurality of tabs,
wherein each guide member inclines upwardly from a first end positioned at a distal end of a respective tab toward a second end positioned at a proximal end of the respective tab.

12. The tray apparatus of claim 1, further comprising:
a ledge attached to the platform and configured to receive the box from the platform, and
a sensor associated with the ledge and configured to detect another box on the ledge,
wherein the plate of the tray mechanism is prevented from moving from the second state toward the first state when the sensor detects the another box on the ledge.

13. The tray apparatus of claim 12, wherein the sensor is an optical sensor.

14. A tray apparatus comprising:
an elongated platform; and
a tray mechanism including:
a plate disposed onto the platform and configured to receive a box containing foodstuffs from a conveyance apparatus, wherein:
the plate is movable in a first longitudinal direction of the platform when moving from a first state toward a second state, and
the plate is also movable in a second longitudinal direction of the platform that is opposite the first longitudinal direction when moving from the second state toward the first state;
an alignment mechanism attached to the platform, wherein:
the alignment mechanism includes a guide plate and a stopping plate,
the guide plate is configured to move the box laterally relative to the platform when the plate moves from the first state toward the second state a first distance,
the stopping plate is attached to the guide plate, and
the stopping plate is configured to contact and prevent the box from moving further in the first longitudinal direction when the plate moves from the first state toward the second state a second distance;
a ledge attached to the platform and configured to receive the box from the platform; and
a sensor associated with the ledge and configured to detect an object on the ledge, wherein the plate of the tray mechanism is prevented from moving from the second state toward the first state when the sensor detects the object on the ledge.

15. The tray apparatus of claim 14, wherein the guide plate and the platform cooperate to define a space that accommodates the plate when the plate moves between the first and second states.

16. The tray apparatus of claim 14, wherein the sensor is an optical sensor.

17. The tray apparatus of claim 14, wherein:
the tray mechanism further includes a sliding mechanism movable between a first position and a second position,
the plate is cantilevered to the sliding mechanism,
the plate is movable from the first state toward the second state when the sliding mechanism moves from the first position toward the second position, and
the plate is movable from the second state toward the first state when the sliding mechanism moves from the second position toward the first position.

18. The tray apparatus of claim 14, wherein a bottom surface of the plate has a Teflon® coating.

19. The tray apparatus of claim 14, further comprising:
a plurality of tabs integral with and extending outwardly from a lateral side of the platform,
wherein the plurality of tabs is configured to interface with the conveyance apparatus.

20. The tray apparatus of claim 19, further comprising:
guide members attached to the plurality of tabs,
wherein each guide member inclines upwardly from a first side facing away from the ledge toward a second side facing toward the ledge.

* * * * *